(12) United States Patent
Yokoi (10) Patent No.: US 9,158,100 B2
(45) Date of Patent: Oct. 13, 2015

(54) LASER MICROSCOPE USING PHASE-MODULATION TYPE SPATIAL LIGHT MODULATOR

(75) Inventor: Eiji Yokoi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 674 days.

(21) Appl. No.: 12/916,725

(22) Filed: Nov. 1, 2010

(65) Prior Publication Data

US 2011/0109958 A1 May 12, 2011

(30) Foreign Application Priority Data

Nov. 6, 2009 (JP) ................. 2009-254566

(51) Int. Cl.
*G02B 21/06* (2006.01)
*G02B 21/00* (2006.01)
*G02B 21/16* (2006.01)

(52) U.S. Cl.
CPC ............ *G02B 21/0032* (2013.01); *G02B 21/06* (2013.01); *G02B 21/16* (2013.01)

(58) Field of Classification Search
CPC .. G02B 21/00; G02B 21/002; G02B 21/0024; G02B 21/0048; G02B 21/0056; G02B 21/06; G02B 21/14; G02B 21/0004; G02B 21/0008; G02B 21/0016; G02B 21/0032; G02B 21/0096; G02B 21/082; G02B 21/16; G02B 21/361
USPC .................................................. 359/368–390
See application file for complete search history.

(56) References Cited

U.S. PATENT DOCUMENTS

| 4,732,473 | A | 3/1988 | Bille et al. |
| 5,308,976 | A | 5/1994 | Misawa et al. |
| 6,094,300 | A | 7/2000 | Kashima et al. |
| 6,483,641 | B1 * | 11/2002 | MacAulay .................... 359/385 |
| 6,903,347 | B2 * | 6/2005 | Baer .......................... 250/492.2 |
| 7,180,661 | B2 * | 2/2007 | Sasaki .......................... 359/385 |

(Continued)

FOREIGN PATENT DOCUMENTS

| JP | 04-354532 A | 12/1992 |
| JP | 09-164331 A | 6/1997 |

(Continued)

OTHER PUBLICATIONS

V. Nikolenko et al; SLM Microscopy: Scanless Two-Photon Imaging and Photosimulation with Spatial Light Modulators; Frontiers in Neural Circuits; Dec. 2008: vol. 2, Article 5, pp. 1-14.

(Continued)

*Primary Examiner* — Thong Nguyen (74) *Attorney, Agent, or Firm* — Holtz, Holtz, Goodman & Chick PC (57) ABSTRACT

A laser microscope comprises a laser light source emitting illumination light; an objective applying the illumination light on a sample; a light path compounding unit compounding a first illumination light path and a second illumination path between the laser light source and the objective; a phase-modulation type spatial light modulator placed on a position on the first illumination path, the position also being optically conjugate with a pupil position of the objective, modulating a phase of the illumination light; and a two-dimensional scanning unit placed on the second illumination light path, scanning the sample in a plane orthogonal to an optical axis of the objective.

14 Claims, 6 Drawing Sheets

(56) References Cited

U.S. PATENT DOCUMENTS

| | | | |
|---|---|---|---|
| 7,274,446 B2 * | 9/2007 | Wolleschensky et al. | 356/300 |
| 7,527,201 B2 | 5/2009 | Fukuchi et al. | |
| 7,619,732 B2 * | 11/2009 | Gugel et al. | 356/318 |
| 8,730,582 B2 * | 5/2014 | Yokoi | 359/656 |
| 2003/0197924 A1 * | 10/2003 | Nakata | 359/368 |
| 2005/0122579 A1 * | 6/2005 | Sasaki | 359/385 |
| 2006/0043184 A1 | 3/2006 | Fukuchi et al. | |
| 2007/0206276 A1 * | 9/2007 | Gugel et al. | 359/385 |
| 2007/0263282 A1 * | 11/2007 | Takamizawa et al. | 359/384 |
| 2007/0295892 A1 | 12/2007 | Kanegae et al. | |
| 2008/0156999 A1 * | 7/2008 | Nishiwaki et al. | 250/458.1 |
| 2008/0316575 A1 | 12/2008 | Curtis et al. | |
| 2009/0027747 A1 | 1/2009 | Lee et al. | |
| 2010/0014156 A1 * | 1/2010 | Iketaki | 359/385 |
| 2011/0267663 A1 * | 11/2011 | Murayama | 359/9 |

FOREIGN PATENT DOCUMENTS

| | | |
|---|---|---|
| JP | 10-206742 A | 8/1998 |
| JP | 2004-109219 A | 4/2004 |
| JP | 2004-309785 A | 11/2004 |
| JP | 2005-165212 A | 6/2005 |
| JP | 2005-292538 A | 10/2005 |
| JP | 2006-072280 A | 3/2006 |
| JP | 2008-026885 A | 2/2008 |

OTHER PUBLICATIONS

Japanese Office Action dated Nov. 26, 2013 (and English translation thereof) in counterpart Japanese Application No. 2009-254566.

* cited by examiner

LASER MICROSCOPE USING PHASE-MODULATION TYPE SPATIAL LIGHT MODULATOR

CROSS-REFERENCE TO RELATED APPLICATIONS

This application is based upon and claims the benefit of priority from the prior Japanese Patent Application No. 2009-254566, filed Nov. 6, 2009, the entire contents of which are incorporated herein by this reference.

BACKGROUND OF THE INVENTION

1. Field of the Invention

The present invention relates to an art of a laser microscope, and especially to an art of a laser microscope using a phase-modulation type spatial light modulator.

2. Description of the Related Art

A technique to control the spatial distribution and intensity (hereinafter, referred to as a pattern) of light as needed and to apply light of a desired pattern on an object using a spatial light modulator (SLM) having a plurality of optical modulation elements (hereinafter, referred to as pixel elements) that are controlled independently from each other has been known.

While various kinds of SLMs have been proposed so far, an SLM in which pixel elements modulate the intensity of light (hereinafter, referred to as an intensity-modulation type SLM) as represented by Digital Micromirror Device (DMD) and an SLM in which pixel elements modulate the phase of light (hereinafter, referred to as a phase-modulation type SLM) has become popular.

An intensity-modulation type SLM is capable of applying light of a desired pattern by directly projecting the pattern of the intensity of light formed on the intensity-modulation type SLM on an object. However, for an intensity-modulation type SLM, a problem has been pointed out that since the pattern of the intensity of light is formed by eliminating incoming light selectively by the pixel elements, the light use intensity is low, and the density of the light applied on the object is also low.

By contrast, a phase-modulation type SLM changes the wavefront form of incoming light by phase modulation using a coherent light source such as a laser light source. This makes it possible to change the intensity distribution of light on an object and to form light of a desired pattern. In a phase-modulation type SLM, a desired pattern is formed by changing the phase distribution of light, little loss of light occurs in principle. For this reason, a higher light use efficiency can be achieved compared with an intensity-modulation type SLM. Japanese Laid-open Patent Publication 2006-72280 discloses a pattern formation apparatus and an optical tweezers apparatus using a phase-modulation type SLM.

Such a phase-modulation type SLM capable of applying light of a given pattern on an object with a high light density by suppressing loss of light and achieving a high light use efficiency has been applied to the field of laser microscopes such as a fluorescent microscope. In particular, application to a fluorescent microscope using nonlinear optical phenomena that requires a very high light density is effective, and Volodymyr Nikolenko and five others, "SLM microscope: scanless two-photon imaging and photostimulation with spatial light modulators", Frontiers in Neural Circuits, 19 Dec. 2008, Volume 2, Article 5, p. 1-14 (hereinafter, referred to as non-patent document 1) discloses a two-photon excitation microscope being a type of nonlinear microscopes.

The microscope disclosed in non-patent document 1 is capable of applying light of a given pattern (hereinafter, referred to as light pattern application) on an object while suppressing loss of light by using a phase-modulation type SLM. For this reason, light with a high light density required for generating a nonlinear phenomenon can be applied on a plurality of parts of an object simultaneously without scanning the object.

Incidentally, with fluorescent observation using a fluorescent microscope, there is need to observe dynamic changes of an object (including dynamic change of a fluorescent material included in an object) that occur with the light pattern application, such as photoactivation, photoconversion, FRAP (Fluorescence Recovery After Photobleaching), FLIP (Fluorescence Loss In Photobleaching) and so on. In order to meet the need, a function for imaging a given area of an object aside from a light pattern application area is needed.

Meanwhile, such need to observe dynamic changes of an object is present not only with fluorescent microscopes but also with other laser microscopes.

The microscope disclosed in the non-patent document 1 has a galvanometer scanner as scanning means. For this reason, it can be used also as a normal laser scanning microscope (hereinafter, referred to as LSM), and is capable of imaging a given area of an object.

Meanwhile, in the microscope disclosed in the non-patent document 1, the phase-modulation type SLM for the light pattern application and the scanning means for imaging of the object are placed on the same light path.

SUMMARY OF THE INVENTION

An aspect of the present invention provides a laser microscope including a laser light source emitting illumination light; an objective applying the illumination light on a sample; a light path compounding unit compounding a first illumination light path and a second illumination path between the laser light source and the objective; a phase-modulation type spatial light modulator placed on a position on the first illumination path, the position also being optically conjugate with a pupil position of the objective, modulating a phase of the illumination light; and a two-dimensional scanning unit placed on the second illumination light path, scanning the sample in a plane orthogonal to an optical axis of the objective.

BRIEF DESCRIPTION OF THE DRAWINGS

The present invention will be more apparent from the following detailed description when the accompanying drawings are referenced.

DESCRIPTION OF THE PREFERRED EMBODIMENTS

Hereinafter, each embodiment is explained with reference to drawings.

Embodiment 1

Figure 1:
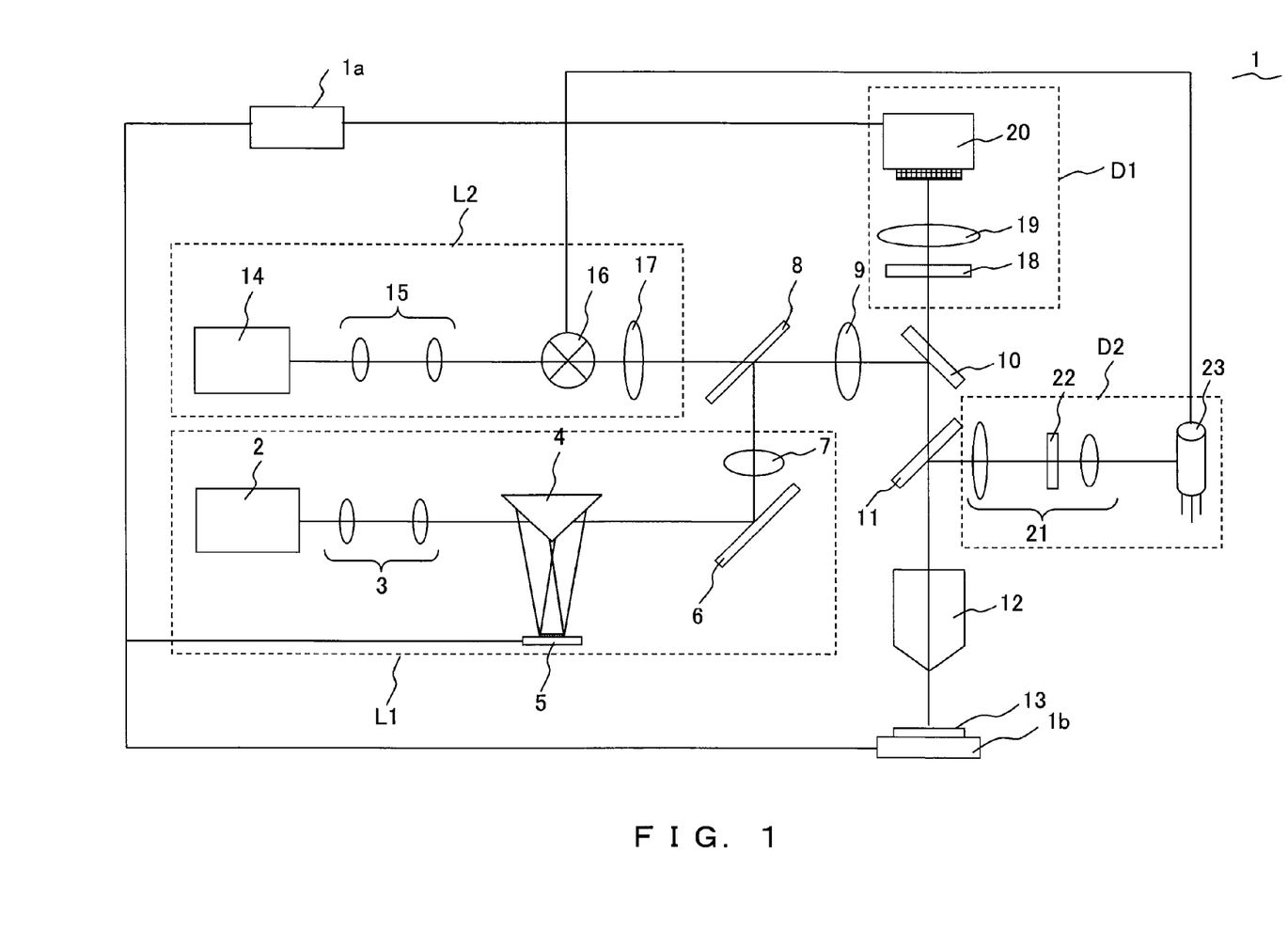
FIG. 1 is a diagram illustrating the configuration of a laser microscope according to the embodiment 1.

FIG. 1 is a conceptual diagram illustrating the configuration of a laser microscope according to the present embodiment. A laser microscope 1 is a two-photon excitation microscope that excites a sample 13 using a two-photon process by ultra-short pulse laser light (illumination light) in the infrared territory emitted from a titanium-sapphire laser being a laser light source.

First, the configuration of the laser microscope 1 according to the present embodiment is explained.

The laser microscope 1 is configured including a control unit 1a, a first lighting unit L1, a second lighting unit L2, a dichroic mirror 8, a tube lens 9, a dichroic mirror 10, a dichroic mirror 11, an objective 12 that applies laser light on the sample 13, a stage 1b on which the sample 13 is placed and that moves in the direction of the optical axis of the objective 12, a first detection unit D1, and a second detection unit D2.

The first lighting unit L1 is a lighting unit that applies light of a desired pattern on the sample 13. Specifically, it is configured including a titanium sapphire laser 2 that emits ultra-short pulse laser light (first illumination light) in the infrared territory, a beam expander 3 that adjusts the luminous flux diameter of the laser light, a prism-type mirror 4, a phase-modulation type SLM 5 modulating a phase of laser light according to a desired pattern, a mirror 6 and a pupil relay lens 7.

Meanwhile, the SLM 5 is placed on a position that is on a first illumination light path and is optically conjugate with the pupil position of the objective 12. As the SLM 5, for example, a reflection-type or transmission-type liquid crystal phase modulator, a reflection-type mirror phase modulator that generates a difference in the light path length by driving a mirror can be used.

Generally, in an ideal lens system without aberration, the relationship of Fourier transform is established between the imaging position and the pupil position and the intensity distribution at the imaging position is obtained by performing Fourier transform of the pupil function. In other words, assuming that the sample 13 is placed on the focal plane of the objective 12 while ignoring the aberration of the objective 12, the pupil position and the sample plane (sample 13) are in the relationship of Fourier transform. According to this, it can be said that the sample plane is also a Fourier transform plane with respect to the SLM 5 placed on the pupil conjugate position of the objective 12.

For example, when the phase of laser light is not modulated in the SLM 5 and the laser light is emitted from the SLM 5 as parallel light in phase, the point image obtained by the Fourier transform of the amplitude distribution of the laser is formed on a point on the sample 13 being the Fourier transform plane. On the other hand, when the phase of the laser light is modulated to a sinusoidal grating pattern, the emitted laser light is transformed into a plane wave having a first-order travelling direction in the positive and negative territories, and the laser light can be collected on different two points on the sample 13 being the Fourier transform plane.

Thus, the first lighting unit L1 is capable of applying light of a desired pattern on the sample 13 by controlling the modulation of the phase in the SLM 5. Specifically, for example, it is capable of applying light of a pattern adjusted to the shape of the object such as a cell. In addition, it is also capable of applying light on only one point on the sample 13 as well as to applying light on a plurality of points simultaneously. In addition, it is also capable of illuminating a desired area on the sample 13 evenly. Therefore, the first lighting unit L1 can be used both as a stimulation unit and as a lighting unit for normal fluorescent observation.

The second lighting unit L2 is configured including a titanium sapphire laser 14 that emits infrared laser (second illumination light) of a different wavelength than that for the titanium sapphire laser 2, a beam expander 15 that adjusts the luminous flux diameter of the laser light, an XY scanner 16 being a two-dimensional scanning unit scanning the sample 13 two dimensionally on a plane orthogonal to the optical axis of the objective 12, and a pupil relay lens 17.

Meanwhile, the titanium sapphire laser 14 also emits ultra-short pulse laser light to generate two-photon excitation in the same manner as the titanium sapphire laser 2. In addition, it is desirable that the XY scanner 16 is placed on a position or in the vicinity of a position that is on a second light path in the second lighting unit L2 and is optically conjugate with the pupil position of the objective 12. As the XY scanner 16, for example, a galvanomirror, an acoustic optical deflector (AOD) and the like can be used.

Since the second lighting unit L2 operates in the same manner as a lighting unit of a normal laser scanning microscope, it is capable of applying light on given one point on the sample 13 by controlling the XY scanner 16. For this reason, in the same manner as the first lighting unit, the second lighting unit L2 can be used both as a stimulation unit and as a lighting unit for normal fluorescent observation.

Meanwhile, since the light from the second lighting unit L2 is collected on one point on the sample 13, when there is a need to illuminate a plurality of points simultaneously or to apply light of a certain shape, use of the first lighting unit L1 is more effective.

Since the first lighting unit L1 and the second lighting unit L2 are provided on different light paths, they do not affect each other, and each of them is controlled independently. In addition, illumination light emitted from each of the lighting units is compounded by the dichroic mirror 8 described later and applied on the sample 13 simultaneously.

For this reason, by using either one of the first lighting unit L1 and the second lighting unit L2 as a lighting unit for normal fluorescent observation and using the other as a stimulation unit, dynamic change of the sample 13 with stimulation can be observed almost at the same time as the stimulation.

Especially, when the first lighting unit L1 is used as a stimulation unit and the second lighting unit L2 is used as a lighting unit for normal fluorescent observation, dynamic change of the sample 13 with stimulation by light of a desired pattern can be observed almost at the same time as the stimulation.

The first detection unit D1 is configured including a infrared ray cutting filter 18 that cuts off light of a wavelength in the infrared territory (hereinafter, referred to as an IR cutting filter), a tube lens 19, a charge coupled device (hereinafter, referred to as CCD) 20 being an light detector that converts fluorescence into an electric signal.

Meanwhile, the CCD 20 is a two-dimensional sensor having a plurality of pixel parts and being placed on a position that is optically conjugate with the sample 13. For this reason, the spatial distribution of the intensity (intensity distribution)

of fluorescence generated on the focal plane of the sample 13 is projected on the CCD 20 and detected by the CCD 20.

The second detection unit D2 is configured including a relay lens 21, an IR cutting filter 22 that cuts off light of a wavelength in the infrared territory, and a photomultiplier tube (hereinafter, referred to as PMT) 23 being a light detector that converts fluorescence into an electric signal.

Meanwhile, it is desirable that the PMT 23 is placed in the vicinity of a position that is optically conjugate with the pupil position of the objective 12. In the laser microscope 1, it is placed in the vicinity of a position on which the pupil of the objective 12 is relayed by the relay lens 21. This makes it possible to detect fluorescence generated from a given area of the sample 13 by configuring the relay lens 21 so that the pupil of the objective 12 is projected within the light receiving plane of the PMT 23.

The control unit 1a is connected to the stage 1b, SLM 5, XY scanner 16, CCD 20 and PMT 23, and controls each of them.

Next, the flow from emitting laser light (illumination light) from the laser light source to detecting fluorescence (detection light) is specifically described. Meanwhile, hereinafter, description is made with an example of a case in which the first lighting unit L1 is used as a stimulation unit and the second lighting unit L2 is used as a lighting unit for fluorescent observation.

Laser light (first illumination light) emitted from the titanium sapphire laser 2 enters the beam expander 3 first, and the luminous flux diameter of the laser light is adjusted in line with the size of the SLM 5. Further, it is deflected so as to enter the SLM 5 at an angle according to the specification of the SLM 5 by the prism-type mirror 4, and enters the SLM 5 as parallel light.

The laser light that entered the SLM 5 being the phase-modulation type is modulated so that light of a desired pattern is formed on the sample 13. More strictly speaking, the phase of the laser light is modulated. After that, it is deflected again by the prism-type mirror 4, and enters the dichroic mirror 8 through the mirror 6 and the pupil relay lens 7.

The dichroic mirror 8 is an optical element that reflects or passes incoming light according to the wavelength. The dichroic mirror 8 is placed between the laser light source (the titanium sapphire laser 2 and the titanium sapphire laser 14) and the objective 12, and functions as a light path compounding unit that compounds the first illumination light path in which the SLM 5 is placed and the second illumination light path in which the XY scanner 16 is placed. Specifically, the dichroic mirror 8 has a characteristic to reflect laser light (first illumination light) that goes through the first illumination light path and to pass laser light (second illumination light) that goes through the second illumination light path. For this reason, the laser light (first illumination light) entering the dichroic mirror 8 is reflected on the dichroic mirror 8, and enters the dichroic mirror 10 through the tube lens 9 that constitutes a relay optical system to project the SLM 5 on the pupil of the objective 12 together with the pupil relay lens 7.

The dichroic mirror 10 and the dichroic mirror 11 function as detection light path separation unit that separates fluorescence (detection light) generated from the sample 13 by the application of the laser light from the laser light (illumination light) and to guide it to a detection light path. Meanwhile, in the laser microscope 1 according to the present invention, the dichroic mirror 10 and the dichroic mirror 11 are placed between the objective 12 and the XY scanner 16. While it is to be described in greater detail later, the dichroic mirror 10 has a characteristic to selectively pass fluorescence of a particular wavelength region, and the dichroic mirror 11 has a characteristic to selectively reflect fluorescence of a particular wavelength region. For this reason, the laser light that entered the dichroic mirror 10 is reflected on the dichroic mirror 10, and further passes through the dichroic mirror 11 and enters the objective 12.

Then, as the objective 12 in which the laser light has entered forms a desired pattern according to the phase modulation by the SLM. 5 on its focal plane, laser light of a desired pattern is applied on the sample 13.

Meanwhile, laser light (second illumination light) emitted from the titanium sapphire laser 14 enters the beam expander 15 first. Then, the laser light whose luminous flux diameter has been adjusted by the beam expander 15 enters the XY scanner 16 as parallel light. The laser light that entered the XY scanner 16 is deflected to the direction according to the scanning position of the sample 13, and enters the dichroic mirror 8 through the pupil relay lens 17.

The dichroic mirror 8 has a characteristic to pass laser light (second illumination light) that goes through the second illumination light path. For this reason, the laser light (second illumination light) that entered the dichroic mirror 8 passes through the dichroic mirror 8. Thereafter, the laser light (second illumination light) emitted from the titanium sapphire laser 14 travels through the same light path as the laser light emitted from the titanium sapphire laser 2 and enters the sample 13.

Meanwhile, the pupil relay lens 17 constitutes a relay optical system that projects the XY scanner 16 on the pupil of the objective lens 12 together with the tube lens 9. For this reason, the laser light (second illumination light) that enters the XY scanner 16 as parallel light enters the pupil of the objective 12 as parallel light, and converges on one point on the sample 13. For this reason, by moving the convergence position two dimensionally by the XY scanner 16, scanning can be performed on the sample 13.

Thus, in the sample 13 on which laser light emitted from the titanium sapphire laser 2 and the titanium sapphire laser 14 is applied, the fluorescent material is excited through a two-photon process and fluorescence is emitted.

When laser light emitted from the titanium sapphire laser 2 of the first lighting unit L1 used as a stimulation unit is applied to the sample 13 to give light stimulation, the fluorescent material is bleached and the amount of luminescence from the fluorescent material decreases.

In the laser microscope 1 according to the present embodiment, dynamic change of the sample 13 such as decrease and recovery in the amount of luminescence from the fluorescent material with the light stimulation can be observed by detecting fluorescence from the sample 13 constantly before, during and after the light stimulation.

In this case, a dichroic mirror having a characteristic to selectively reflect fluorescence generated by the illumination light from the second lighting unit L2 is used as the dichroic mirror 11.

According to this, the fluorescence that has been emitted from the sample 13 and entered the dichroic mirror 11 through the objective 12 is reflected on the dichroic mirror 11 and enters the second detection unit D2. The fluorescence that entered the second detection unit D2 enters the PMT 23 placed in the vicinity of a position on which the pupil of the objective 12 is relayed by the relay lens 21 through the relay lens 21 and the IR cutting filter 22. Thus, the fluorescence generated from each of the convergence positions changed by the scanning by the XY scanner 16 is detected, and change in the amount of fluorescence generated in the sample 13 can be observed.

Meanwhile, the IR cutting filter 18 and the IR cutting filter 22 are for improving the accuracy of the fluorescence detection in the light detector, and cuts off infrared laser light that has been reflected on the sample 13, the objective 12 and other optical elements and passed through the dichroic mirror 10.

Thus, according to the laser microscope 1 according to the present embodiment, since the control of the desired pattern is performed by the SLM 5 and the control of the scanning on the sample 13 is performed by the XY scanner 16, they can be controlled separately without affecting each other. For this reason, by emitting laser light from the titanium sapphire laser 2 and the titanium sapphire laser 14 simultaneously, light stimulation of a desired pattern can be given to the sample 13 while performing fluorescent observation of the sample 13. Therefore, dynamic change of the sample 13 occurring over before, through and after the light stimulation can be observed with a high time resolution with no time lag occurs between the light pattern application and imaging.

Meanwhile, while a case of using the first lighting unit L1 as a stimulation unit and the second lighting unit L2 as a lighting unit for fluorescent observation, this is not a particular limitation.

The laser microscope 1 according to the present invention can also use the first lighting unit L1 as a lighting unit for fluorescent observation and the second lighting unit L2 as a stimulation unit.

The first lighting unit L1 forms, by the SLM 5, for example, a light pattern according to the shape of the observation object such as a cell included in the sample 13, applies the light pattern on the sample 13, to excite the sample 13. Meanwhile, the second lighting unit L2 stimulates given one point on the sample 13. Then, dynamic change of the sample 13 may be observed with a high time resolution by detecting fluorescence generated with the illumination light from the first lighting unit L1 by the CCD 20 being a two-dimensional sensor. In this case, as the dichroic mirror 10, a dichroic mirror having a characteristic to selectively pass fluorescence generated with the illumination light from the first lighting unit L1 is used. In addition, the dichroic mirror 11 is switched by a switching mechanism that is not illustrated in the drawing to a filter that passes illumination light and fluorescence. Alternatively, it is removed from the light path by an inserting and removing mechanism that is not illustrated in the drawing to let fluorescence enter the first detection unit D1.

In addition, the laser microscope 1 according to the present embodiment can also use the first lighting unit L1 and the second lighting unit L2 as lighting units for fluorescent observation that respectively excite different fluorescent materials.

The first lighting unit L1 illuminates and excites a desired area of the sample 13 by applying a light pattern on the sample 13 by the SLM 5. The second lighting unit illuminates and excites a desired area of the sample 13 by changing the position to apply light over time by the scanning unit. Then, stimulation is given to the sample 13 by electricity and so on. Dynamic change of the sample 13 generated in this manner may also be observed with a high time resolution. In this case, as the dichroic mirror 10, a dichroic mirror having a characteristic to selectively pass fluorescence generated with illumination light from the first lighting unit L1 is used, and as the dichroic mirror 11, a dichroic mirror having a characteristic to selectively pass fluorescence generated with illumination light from the first lighting unit L1 and to selectively reflect fluorescence generated with illumination light from the second lighting unit L2 is used.

According to this, fluorescence generated with two-dimensional illumination by the first lighting unit L1 is detected by the CCD 20 being a two-dimensional sensor, and fluorescence generated with point-like illumination by the second lighting unit L2 is detected by the PMT 23.

In addition, while an example in which the laser microscope 1 is used for FRAP and FLIP to observe a decrease and recovery in the amount of fluorescence with light stimulation is described above, this is not a particular limitation. The laser microscope according to the present embodiment may be used for observation of a phenomenon in which change in the sample 13 itself and in a fluorescent material included in the sample 13 is induced by light stimulation and the fluorescence wavelength is changed as a result.

For example, a cell in which caged glutamine acid is introduced is activated by applying stimulation light of a wavelength to release it, and change in the calcium concentration and membrane potential is induced. Then, each change can be detected as change in the fluorescent intensity and fluorescence wavelength by using a calcium-sensitive fluorescent dye and a membrane-potential sensitive fluorescent dye.

In addition, with abrasion, the role of a broken part can be identified by directly breaking a part of the sample and observing the form of the remaining sample and change in its activity.

In addition, in photoconversion and the like being a phenomenon in which a fluorescent material changes, fluorescence of a different wavelength than that for fluorescence generated with normal excitation is generated with light stimulation.

Meanwhile, when dynamic change of the sample 13 is observed using change in the fluorescence wavelength as described above, the first detection unit D1 and the second detection unit D2 are required to have functions to detect fluorescence of different wavelengths respectively. For this reason, in the first detection unit D1, a color CCD may be used as the CCD 20. In addition, the second detection unit D2 may be configured to be equipped further with a wavelength division element such as a dichroic mirror to let light of wavelengths before and after change enter different PMTs respectively.

Embodiment 2

Figure 2:
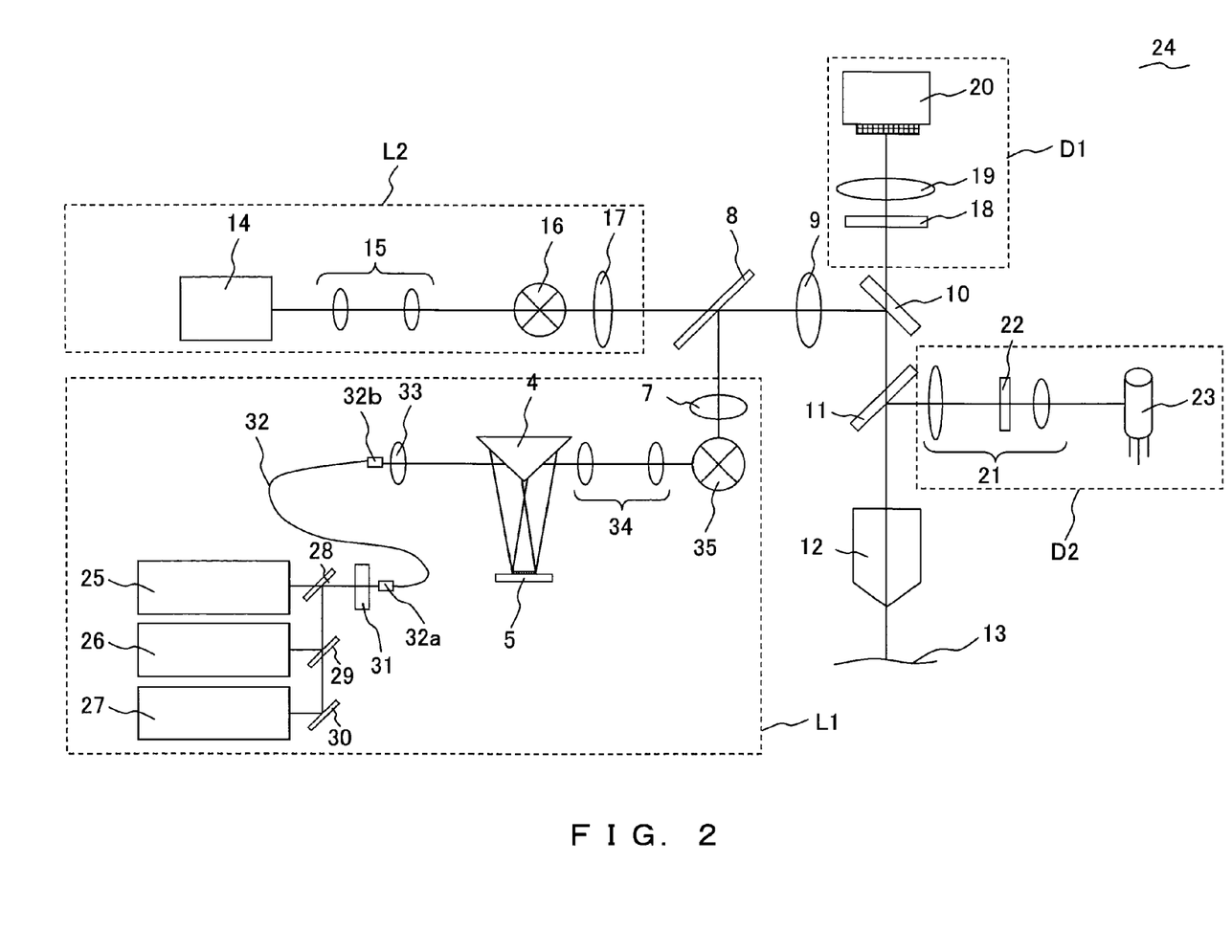
FIG. 2 is a diagram illustrating the configuration of a laser microscope according to the embodiment 2.

FIG. 2 is a conceptual diagram illustrating the configuration of a laser microscope according to the present embodiment.

In a laser microscope 24 according to the present embodiment, the configuration of the first lighting unit L1 is different from that for the laser microscope 1. Since the other configurations are the same as in the laser microscope 1, the same numerals are attached and description is omitted. Meanwhile, while the laser microscope 24 has a control unit and a stage in the same manner as the laser microscope 1, these are omitted in FIG. 2.

The first lighting unit L1 of the laser microscope 24 includes, instead of the titanium sapphire laser 2 and the beam expander 3, a plurality of visible laser light sources (laser 25, laser 26, laser 27) that respectively emit laser light of a different wavelength, a dichroic mirror 28, a dichroic mirror 29, a mirror 30, an acoustic optical modulator (hereinafter, referred to as AOM) 31, a single mode optical fiber 32, and a collimating lens 33. In addition, the first lighting unit L1 includes a pupil relay lens 34 and an XY scanner 35 instead of the mirror 6.

Meanwhile, the XY scanner 35 is a unit for moving the position of the light pattern application on the sample 13, and is placed in the vicinity of a position that is between the SLM 5 and the dichroic mirror 8 on the first illumination light path and is optically conjugate with the pupil position of the objective 12. The XY scanner 35 is similar to the XY scanner 16 in being able to scan the sample 13 in the X direction (first direction) and in the Y direction (second direction) that are orthogonal to the optical axis of the objective 12. As the XY scanner 35, for example, a galvanomirror, an acoustic optical deflector (AOD) and the like can be used.

Laser light emitted from each laser light source enters the AOM 31 functioning as a neutral density filter (ND filter) or a shutter. More specifically, laser light emitted from the laser light source 25 passes through the dichroic mirror 28 and enters the AOM 31. Laser light emitted from the laser light source 26 is reflected on the dichroic mirror 29, dichroic mirror 28 and enters the AOM 31. Laser light emitted from the laser light source 27 is reflected on the mirror 30, passes through the dichroic mirror 29 and is further reflected on the dichroic mirror 28, and enters the AOM 31.

Laser light emitted from the AOM 31 enters the single mode optical fiber 32 from an entering end 32a, and emitted from an emitting end 32b to the collimating lens 33. The laser light is further converted into parallel light by the collimating lens 33, deflected by the prism-type mirror 4 so as to enter the SLM 5 at an angle according to the specification of the SLM 5, and enters the SLM 5.

Laser light that entered the SLM 5 is modulated so that light of a desired pattern is formed on the sample 13. More strictly speaking, the phase of the laser light is modulated. After that, it is deflected by the prism-type mirror 4 again, and enters the dichroic mirror 8 through the pupil relay lens 34, an XY scanner 35, the pupil relay lens 7. Thereafter, by operation in the same manner as in the laser microscope 1, laser light of a desired pattern is applied on the sample 13.

Each of the first lighting unit L1 and the second lighting unit L2 of the laser microscope 24 according to the present embodiment can be used either as a lighting unit for fluorescent observation or as an stimulation unit, in the same manner as the first lighting unit L1 and the second lighting unit L2 of the laser microscope 1 according to the embodiment 1. Therefore, the same effect as with the laser microscope 1 according to the embodiment 1 can be obtained with the laser microscope 24 according to the present embodiment as well.

In addition, the laser microscope 24 can handle a wider variety of fluorescent materials by using a plurality of visible laser light sources included in the first lighting unit.

Furthermore, the move of the light pattern application position by the XY scanner 35 is faster than the move of the light pattern application position by changing the modulation state of the phase by the SLM 5. For this reason, in the laser microscope 24, the light pattern application position can be moved at a high speed by controlling the XY scanner 35. By such a high speed move, a higher density of the light pattern application can be achieved in addition to the simple position adjustment of the light pattern application. Specifically, application areas on which light is applied simultaneously by the light pattern application are reduced, to raise the density of light to be applied to each position. Then, by moving the application area at a high speed using raster scanning or tornado scanning by the XY scanner 35, a given part can be stimulated or excited with a high density.

Figure 3A:
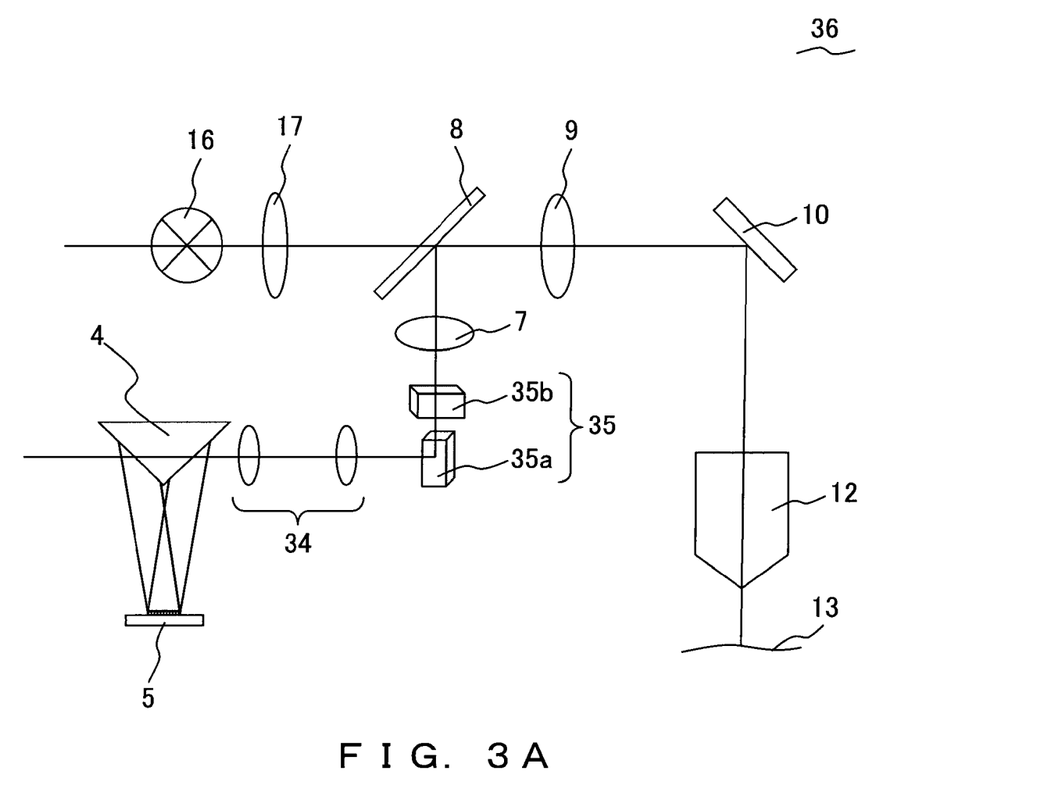
FIG. 3A is a diagram illustrating a variation example of the configuration of a laser microscope according to the embodiment 2.

FIG. 3A is a conceptual diagram illustrating a variation example of the configuration of the laser microscope according to the present embodiment. A laser microscope 36 according to the variation example illustrated in FIG. 3A is in the same configuration as the laser microscope 24 according to the embodiment 2 except for the placement of the XY scanner 35.

The XY scanner 35 includes an X scanner 35a that scans the sample 13 in the X direction (first direction) and a Y scanner 35b that scans the sample 13 in the Y direction (second direction). Normally, in an XY scanner, the two scanners are placed close to each other, so it is not possible to make the XY scanner (two scanners) optically conjugate with the pupil of the objective in strict term.

Figure 3B:
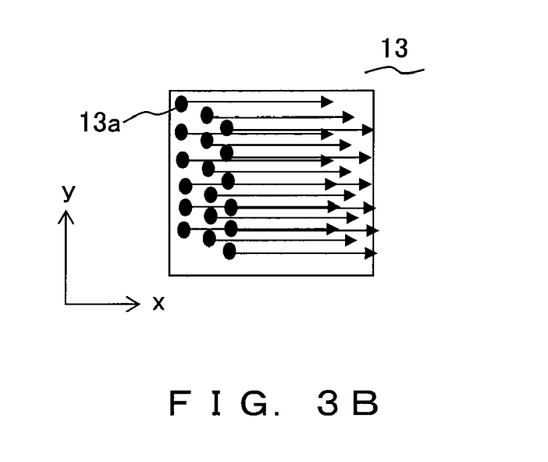
FIG. 3B is a diagram illustrating the moving direction of a light pattern application position of a laser microscope according to the embodiment 2.

In the laser microscope 36, the X scanner 35a is placed on a position that is optically conjugate with the pupil position of the objective 12. By such a placement, with the laser microscope 36, when the light pattern application position is moved in the X direction, degradation of the pattern does not occur. For this reason, as illustrated in FIG. 3B, even when the light density is raised by reducing the application areas, more precise application can be performed on given areas, by assuming movement of the application position 13a in the X direction in advance.

In addition, the Y scanner 35b is used mainly for fine tuning of the position of the light pattern application. Other than that, precise two-dimensional scanning using the X scanner 35a and the Y scanner 35b can also be performed by forming the application position 13a with a high density with respect to the Y direction and reducing the movement amount in the Y direction.

Thus, according to the laser microscope 36 according to the present variation example, the same effect as with the laser microscope 24 according to the embodiment 2 can be obtained. In addition, with the laser microscope 36, when the light density is raised by reducing application areas, application on given parts can be performed more precisely.

Embodiment 3

Figure 4:
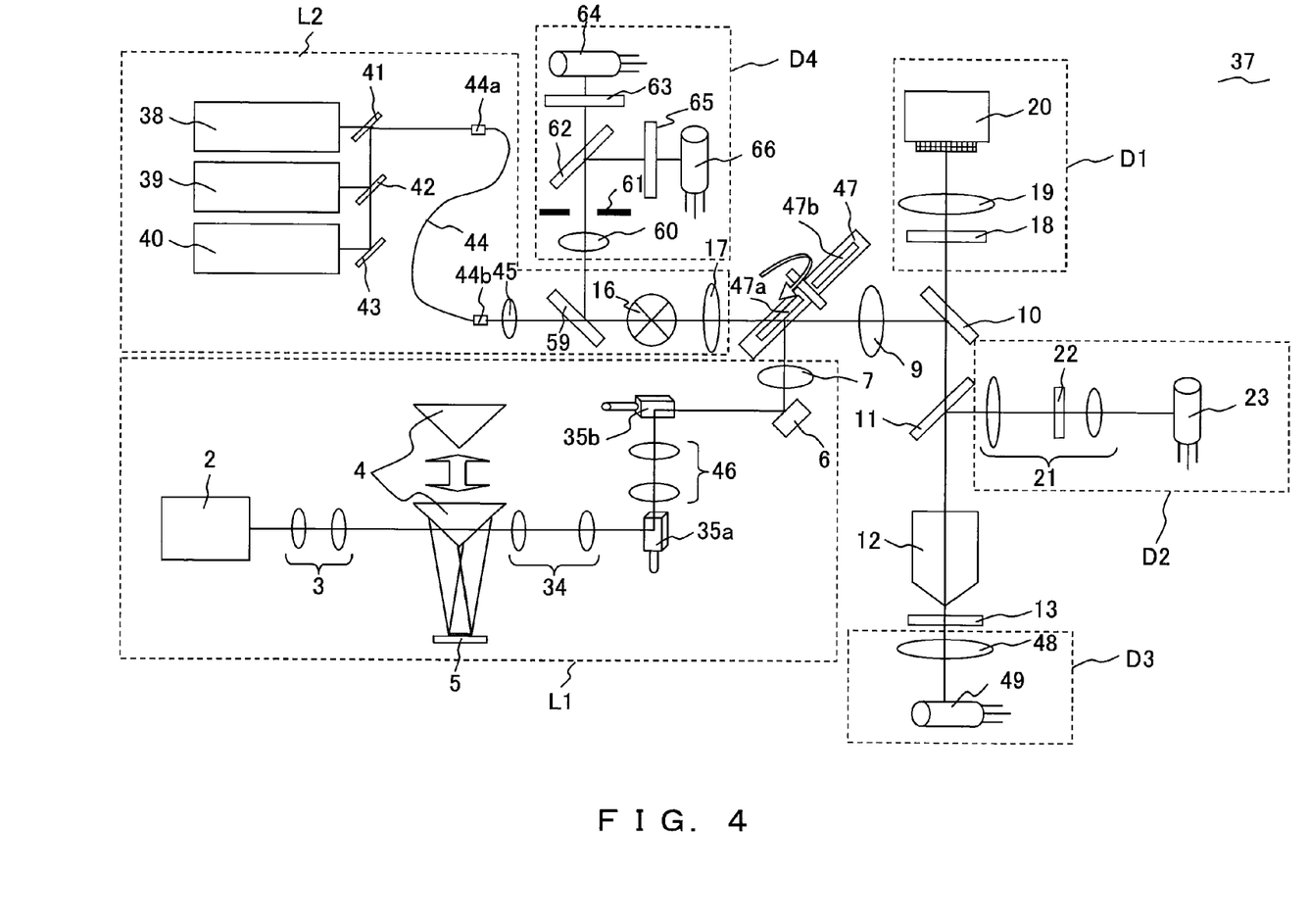
FIG. 4 is a diagram illustrating the configuration of a laser microscope according to the embodiment 3.

FIG. 4 is a conceptual diagram illustrating the configuration of a laser microscope according to the present embodiment.

Many of the constituent elements of a laser microscope 37 according to the present embodiment are the same as in the laser microscope 1 (or a laser microscope 24). For this reason, the same numerals are given to the same constituent elements, and description is omitted. Meanwhile, while the laser microscope 37 has a control unit and a stage as well as the laser microscope 1, these are omitted in FIG. 4.

The laser microscope 37 is configured including a first lighting unit L1, the second lighting unit L2, a turret 47 having dichroic mirrors (dichroic mirror 47a, dichroic mirror 47b), the tube lens 9, the dichroic mirror 10, the dichroic mirror 11, the objective 12 that applies laser light on the sample 13, the first detection unit D1, the second detection unit D2, the third detection unit D3 and the fourth detection unit D4.

The first lighting unit L1 includes the pupil relay lens 34, the X scanner 35a, a pupil relay lens 46 and the Y scanner 35b, and is different from the laser microscope 1 that both the X scanner 35a and the Y scanner 35b are optically conjugate with the pupil of the objective 12. In other words, in the laser microscope 37, the SLM 5, X scanner 35a, the Y scanner 35b, the pupil of the objective 12 are optically conjugate with each other.

According to this, in the laser microscope 37, movement of the light pattern application position does not cause degradation of the pattern. Even when the light density is raised by reducing the application areas, more precise application can be performed on given areas, by assuming movement of the application position.

In addition, the first lighting unit L1 is different from the laser microscope 1 also in that the prism-type mirror 4 is placed to be able to be inserted and removed to/from the first illumination light path.

When the prism-type mirror 4 is removed from the first illumination light path, laser light emitted from the beam expander 3 enters the pupil projection relay lens as parallel light, and is applied to one point on the sample 13, being equal to the laser light in the case of being emitted from the SLM 5 as parallel light in phase without modulation by the SLM 5. In this case, since loss of the amount of light generated by going through the SLM 5 is suppressed, the use efficiency of light of the first lighting unit can be improved further.

In addition, the first lighting unit L1 functions as a unit for realizing pattern lighting by inserting the prism-type mirror 4, and functions as a lighting unit for a normal laser scanning microscope by removing the prism-type mirror 4. For this reason, when there is no need to realize pattern lighting and lighting of a normal laser scanning microscope at the same time, the second lighting unit L2 can be omitted.

The second lighting unit L2 is different from that in the laser microscope 1 in including, instead of the titanium sapphire laser 14 and a beam expander 15, a plurality of visible laser light sources (laser 38, laser 39, laser 40) that respectively emit laser light of a different wavelength, a dichroic mirror 41, a dichroic mirror 42, a mirror 43, a single mode optical fiber 44 having an entering end 44a and an emitting end 44b, a collimating lens 45 and a dichroic mirror 59.

In addition, the turret 47 including a plurality of dichroic mirrors (dichroic mirror 47a, dichroic mirror 47b) is used as a light path compounding unit in stead of dichroic mirror 8. The turret 47 is used to change the dichroic mirror to be placed in the light path according to the wavelength of the laser light emitted from the laser light source.

According to this, the laser microscope 37 can handle a wider variety of fluorescent materials by using a plurality of visible laser light sources included in the first lighting unit.

In addition, the laser microscope 37 is different from the laser microscope 1 also in including the third detection unit D3 and the fourth detection unit D4, in addition to the first detection unit D1 and the second detection unit D2.

The third detection unit D3 is a unit for performing so called transmission detection. In addition, the third detection unit D3 a detection unit for detecting fluorescence (detection light) from a given area of the sample 13 in the same manner as the second detection unit D2. Specifically, it includes a condenser lens 48 (transmission detection optical system) to which light passing through the sample 13 enters, and a PMT 49 being an light detector that converts fluorescence into an electric signal. The transmission detection optical system is suitable not only for detection of fluorescence but also especially for detection of SHG light that generates strong reaction light in the same direction as the direction of lighting. Meanwhile, while it is not illustrated in FIG. 4, a filter that cuts off laser light and selectively passes fluorescence may be provided between the sample 13 and the PMT 49.

The fourth detection unit D4 is also a detection unit for detecting fluorescence from given one point on the sample 13 as well as the second detection unit D2. Specifically, it includes a collective lens 60 that collects incoming light, a confocal stop 61 placed on the focal plane of the collective lens 60, a dichroic mirror 62 that separates fluorescence, a barrier filter 63 and a barrier filter 65 that respectively pass only desired fluorescence, a PMT 64 and a PMT 66 that detect fluorescence.

Meanwhile, the confocal stop 61 is placed on a position that is optically conjugate with the sample 13 (the focal position of the objective 12). For this reason, only fluorescence generated from a point on the sample 13 on which illumination light is collected passes through a pinhole provided in the confocal stop 61, and fluorescence generated from a position other than that is cut off by the confocal stop 61. After that, the fluorescence that passed through the pinhole is reflected or passed through the dichroic mirror. For example, when the second lighting unit L2 is used as a lighting unit for fluorescent observation and when a plurality of fluorescent materials are excited by laser light from a plurality of visible laser light sources, separation of fluorescence emitted from each of the fluorescent materials is performed. Then, among the fluorescence that passed through the dichroic mirror 62, only desired fluorescence passes through the barrier filter 63, and is detected by the PMT 64. In the same manner, among the fluorescence that is reflected by the dichroic mirror 62, only desired fluorescence passes through the barrier filter 65, and is detected by the PMT 66.

Thus, in the fourth detection unit D4, only fluorescence that has been descanned by the XY scanner 16 and has passed the confocal stop that is optically conjugate with the sample 13 is detected. For this reason, unlike the second detection unit D2 and the third detection unit D3, always, only fluorescence generated from given one point on the sample 13 on which illumination light is collected can be detected. Therefore, since detection of unnecessary fluorescence is suppressed, a high resolution can be realized.

Thus, each of the first lighting unit L1 and the second lighting unit L2 of the laser microscope 37 according to the present embodiment can be used either as a lighting unit for fluorescent observation or as a stimulation unit, in the same manner as the first lighting unit L1 and the second lighting unit L2 of the microscope 1 according to the embodiment 1. Therefore, according to the laser microscope 37 according to the present embodiment, the same effect as with the laser microscope 1 according to the embodiment 1 can be obtained.

In addition, with the laser microscope 37, in the same manner as the laser microscope 24 according to the embodiment 2, the light application position of the light pattern application can be moved at a high speed, and the light pattern application can be realized with a higher density. In addition, with the laser microscope 37, in the same manner as the laser microscope 36 according to the variation example of the embodiment 2, degradation of the pattern accompanying high speed movement of the light pattern application can be suppressed. For this reason, even when the light density is raised by reducing the application areas, precise application can be performed on given areas.

In addition, with the laser microscope 37, by detecting fluorescence generated from point-like illumination from the second lighting unit L2 by the fourth detection unit D4 having a confocal stop, high resolution can be realized with even one-photon excitation with visible laser light.

Embodiment 4

Figure 5:
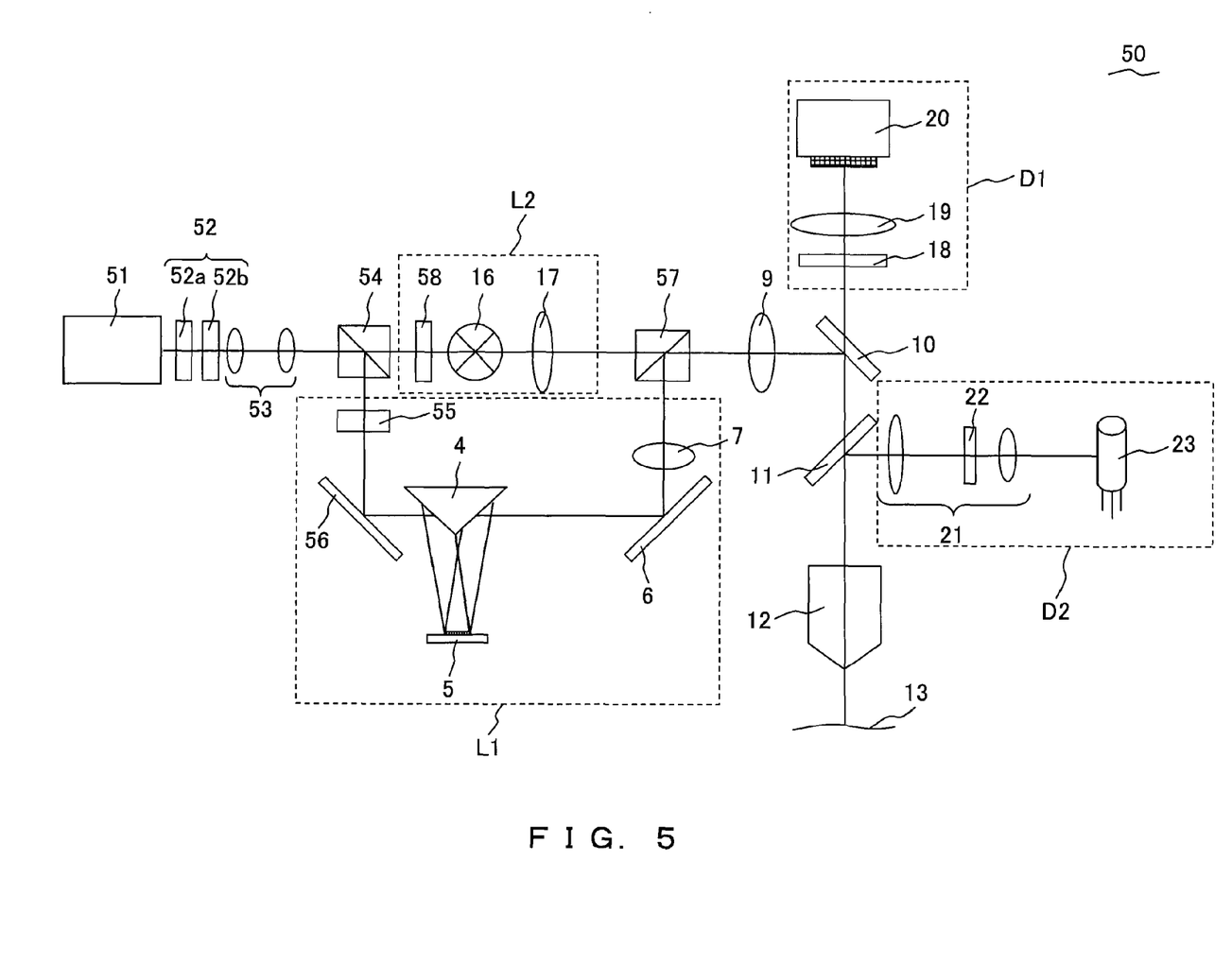
FIG. 5 is a diagram illustrating the configuration of a laser microscope according to the embodiment 4.

FIG. 5 is a conceptual diagram illustrating the configuration of a laser microscope according to the present embodiment. A laser microscope 50 illustrated in FIG. 5 is, in the same manner as the laser microscope 1 illustrated in FIG. 1, a two-photon excitation microscope that excites the sample 13 using a two-photon process by ultra-short pulse laser light (illumination light) in the infrared territory emitted from a titanium-sapphire laser being a laser light source.

Many of the constituent elements of the laser microscope 50 according to the present embodiment are the same as in the laser microscope 1. For this reason, the same numerals are given to the same constituent elements, and description is omitted. Meanwhile, while the laser microscope 50 has a control unit and a stage as well as the laser microscope 1, these are omitted in FIG. 5.

The laser microscope 50 is configured including a titanium sapphire laser 51, a polarization unit 52, a beam expander 53, a PBS 54, the first lighting unit L1, the second lighting unit L2, a PBS 57, the tube lens 9, the dichroic mirror 10, the dichroic mirror 11, the objective lens 12 that applies laser light on the sample 13, the first detection unit D1 and the second detection unit D2.

The polarization unit 52 includes a λ/2 plate 52a and λ/4 plate 52b, and the λ/2 plate 52a and the λ/4 plate 52b are placed to be able to be rotated with respect to the optical axis.

The laser microscope 50 according to the present embodiment is different from the laser microscope 1 according to the embodiment 1 in guiding laser light emitted from the same laser light source to the first lighting unit L1 and the second lighting unit L2 to use for light pattern application and for observation of dynamic change of the sample 13 generated with it.

Laser light (illumination light) being linear polarized light emitted from the titanium sapphire laser 51 first enters the polarization unit 52 and is converted into circular polarized light. Then, it enters the beam expander 53, and after the luminous flux diameter of laser light is adjusted, it enters the PBS 54 as parallel light.

The PBS 54 is an optical element that reflects incoming light or passes incoming light, according to the polarization direction. The PBS 54 divides laser light being circular polarized light into P polarized light (for example, first illumination light) and S polarized light (for example, second illumination light), and guides to the first illumination light path in which the SLM 5 is placed, and to the second illumination light path in which the XY scanner 16 is placed. In other words, the PBS 54 functions as an illumination light path division unit.

The laser light being P polarized light that was divided by the PBS 54 and entered the first lighting unit L1 enters an AOM 55 that functions as a neutral density filter (ND filter) or a shutter. The laser light is further reflected on a mirror 56, deflected by the prism-type mirror 4 so as to enter the SLM 5 at an angle according to the specification of the SLM 5, and enters the SLM 5.

The laser light that entered the SLM 5 is modulated so that light of a desired pattern is formed on the sample 13. More strictly speaking, the phase of the laser light is modulated. After that, it is deflected by the prism-type mirror 4 again, and enters the PBS 57 having the same characteristics as the PBS 54 through the mirror 6 and the pupil relay lens 7.

The PBS 57 functions as a light compounding unit by letting the light came straight through the PBS 54 go straight in the same manner, and reflecting light that was reflected on the PBS 54 in the same manner. For this reason, laser light that entered from the first lighting unit L1 to the PBS 57 is reflected on the PBS 57, and enters the tube lens 9. Thereafter, by the same operation as in the laser microscope 1, laser light of a desired pattern is applied on the sample 13.

Meanwhile, laser light being S polarized light that was divided by the PBS 54 and entered the second lighting unit L2 enters an AOM 58 that functions as a neutral density filter (ND filter) or a shutter. The laser light further enters the XY scanner 16, and is deflected in the direction according to the scanning position of the sample 13. Then, the laser light that entered through the pupil relay lens 17 passes through the PBS 57, travels in the same light path as the laser light from the first lighting unit L1, and enters the sample 13.

Meanwhile, as described above, the λ/2 plate 52a and the λ/4 plate 52b are placed to be able to be rotated. For this reason, by controlling rotation of the λ/2 plate 52a and the λ/4 plate 52b, the intensity ratio of polarized light entering the first lighting unit L1 and the second lighting unit L2 can change arbitrarily.

Thus, each of the first lighting unit L1 and the second lighting unit L2 of the laser microscope 50 according to the present embodiment can be used either as a lighting unit for fluorescent observation or as a stimulation unit, as well as the first lighting unit L1 and the second lighting unit L2 of the laser microscope 1 according to embodiment 1. Therefore, according to the laser microscope 50 according to the present embodiment, the same effect as with the laser microscope 1 according to the embodiment 1 can be obtained.

In addition, since the number of required laser light sources can be reduced, the configuration is simplified, and the laser microscope as a whole can be configured compactly.

Embodiment 5

Figure 6:
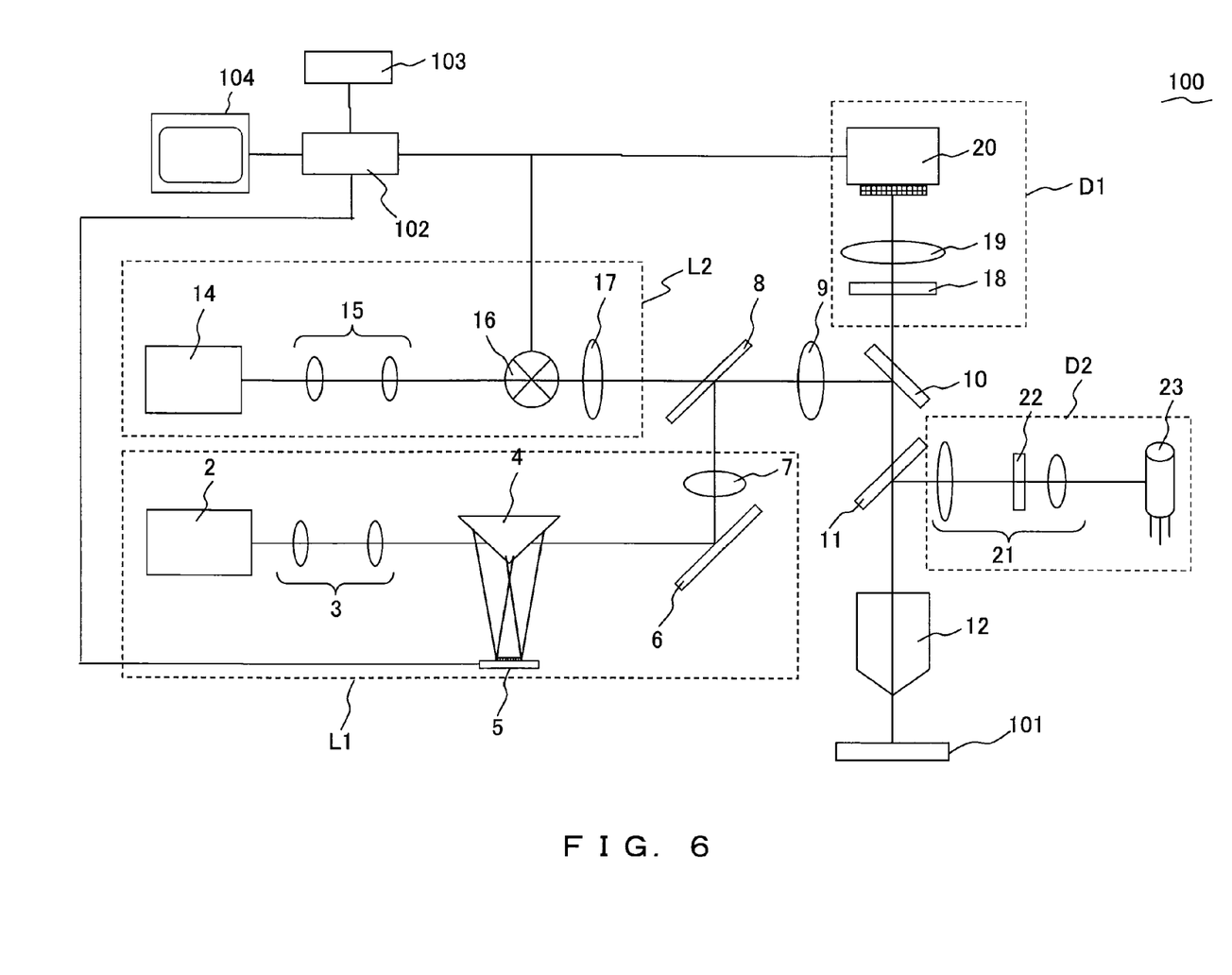
FIG. 6 is a diagram illustrating the configuration of a laser microscope according to the embodiment 5.

FIG. 6 is a conceptual diagram illustrating the configuration of a laser microscope according to the present embodiment. The optical configuration of a laser microscope 100 illustrated in FIG. 6 is the same about optical composition as that of the laser microscope 1 illustrated in FIG. 1. For this reason, the same numerals are given to the same constituent elements, and description is omitted.

The laser microscope 100 differs from the laser microscope 1 illustrated in FIG. 1 in including a storage and calculation unit 103 connected to a control unit 102, and a display unit 104 to improve illumination accuracy of the first lighting unit L1 and the second lighting unit L2.

The control unit 102 is connected to the storage and calculation unit 103, the display unit 104, the CCD 20, the XY scanner 16, the SLM 5 and a stage that is not illustrated in the drawing. The control unit 102 controls the operation of the SLM 5 and the XY scanner 16. In addition, it receives an electric signal from the CCD 20 functioning as an imaging unit and displays it on the display unit 104.

In the storage and calculation unit 103, aberration information of optical systems placed between the SLM 5 and the objective 12, and aberration information of the objective 12 are stored in advance. Specifically, information related to distortion, chromatic aberration of magnification and wavefront aberration for each image height and each wavelength are stored.

In the laser microscope 100 according to the present embodiment, before observation of the sample, advance adjustment is conducted for performing high accuracy light application by the first lighting unit L1 and the second lighting unit L2.

The advance adjustment starts while placing a reference sample 101 on the focal position of the objective 12. The reference sample 101 is a sample for checking the correct position on which illumination light from the first lighting unit L1 and the second lighting unit L2 are applied on the sample, and a fluorescent plate, a mirror and the like can be used for example.

Meanwhile, the application position of illumination light from the first lighting unit L1 and the application position of illumination light from the second lighting unit L2 are detected by the CCD 20. For this reason, the removal of the IR cutting filter, change of the characteristics of the dichroic mirror, and the like are performed as needed.

First, adjustment of the first lighting unit L1 is explained.

The control unit 102 controls the SLM 5 so that light application is performed on the reference sample 101 with a desired pattern. At this time, if the control unit 102 controls the SLM 5 to a phase pattern that is logically obtained from the relationship of Fourier transform established between the reference sample 101 and the SLM 5, actually, the desired pattern is not applied on the reference sample 101. This is due to influences from aberration generated in the objective 12 and the optical systems between the SLM 5 and the objective 12 and manufacturing error. Distortion, chromatic aberration of magnification and wavefront aberration have especially large influences.

Therefore, the control unit 102 controls the SLM 5 to a phase pattern that takes into consideration aberration information of the objective 12 and the optical system between the objective 12 and the SLM 5 measured and stored in the storage and calculation unit 103 in advance. According to this, a light application pattern that is closer to the desired pattern can be obtained.

Alternatively, the applied light application pattern may be observed using the CCD 20. In other words, the CCD 20 images the reference sample 101 on which illumination light whose phase has been modulated in the SLM 5 is applied, to obtain the light application pattern formed by the illumination light on the reference sample 101. The obtained light application pattern is output from the CCD 20, and displayed as an image on the display unit 104.

Then, the control unit 102 compares the light application pattern obtained using the CCD 20 and the desired pattern, and adjusts the phase modulation amount in the SLM 5 so as to reduce difference between the light application and the desired pattern. A light application pattern that is closer to the desired pattern can also be obtained in this way.

Furthermore, the two methods described above, namely the method of controlling the SLM 5 to a phase pattern that takes into aberration information of the optical systems described above and the method of comparing the light application pattern obtained using the CCD 20 and the desired pattern and adjusting the phase modulation amount in the SLM 5 so as to reduce difference between the light application pattern and the desired pattern may be combined. A light application pattern that is further closer to the desired pattern can be obtained in this way.

As described above, the phase modulation amount in the SLM 5 is adjusted by the advance adjustment and optimized, making it possible to perform high accuracy pattern application by the first lighting unit L1 with observation of the actual sample.

Next, adjustment of the second lighting unit L2 is explained.

For the XY scanner 16 being a galvanomirror and the like, separately, adjustment of linearity related to the size of the observation area, the center position of the field of view and the sampling position (for example, adjustment of the sampling clock according to the scanning speed that changes with the swing angle) is performed.

Based on this, the reference sample 101 is illuminated while changing the scanner angle being a control parameter of the XY scanner, and the light application position of the illumination light is checked using the CCD 20. Then, the position of the pixel parts of the CCD 20 corresponding to the checked light application position is associated with the scanner angle and stored in the storage and calculation unit 103.

As described above, by associating the position of the pixel parts of the CCD 20 and the scanner angle of the XY scanner 16, high accuracy pattern application by the second lighting unit L2 with observation of the actual sample can be performed as well.

Thus, according to the laser microscope 100 according to the present embodiment, the same effect as that with the laser microscope 1 according to the embodiment 1 can be obtained.

In addition, the advance adjustment performed before observation of the sample makes it possible to perform high accuracy light application by the first lighting unit L1 and the second lighting unit L2 without being affected by aberration and the like of the optical systems.

What is claimed is:

1. A laser microscope comprising:
    a first laser light source which emits first illumination light;
    a second laser light source which emits second illumination light;
    an objective which applies the first illumination light and the second illumination light on a sample;
    a light path compounding unit which compounds a first illumination light path of the first illumination light and a second illumination light path of the second illumination light;
    a phase-modulation type spatial light modulator which (i) is placed at a position on the first illumination light path between the first laser light source and the light path compounding unit, (ii) modulates a phase of the first illumination light, and (iii) is one of a reflection-type liquid crystal phase modulator, a transmission-type liquid crystal phase modulator, and a reflection-type mirror phase modulator, wherein the position of the spatial light modulator is optically conjugate with a pupil position of the objective;
    a two-dimensional scanning unit which is placed on the second illumination light path between the second laser light source and the light path compounding unit, and which scans the sample in a plane orthogonal to an optical axis of the objective;
    a first relay optical system which relays a pupil of the objective to a first position between the light path compounding unit and the phase-modulation type spatial light modulator; and
    a second relay optical system which relays the pupil relayed to the first position by the first relay optical system to the phase-modulation type spatial light modulator.

2. The laser microscope according to claim 1, wherein the light path compounding unit is changeable according to a wavelength of incoming light.

3. The laser microscope according to claim 1, further comprising, on the first illumination light path and between the phase-modulation type spatial light modulator and the light path compounding unit, a first scanning unit which scans the sample in a first direction orthogonal to the optical axis of the objective.

4. The laser microscope according to claim 3, wherein the first scanning unit scans the sample in the first direction with a pattern of the first illumination light formed on the sample by modulating the phase of the first illumination light by the phase-modulation type spatial light modulator.

5. The laser microscope according to claim 1, further comprising:
    a detection light path separation unit which separates detection light from at least one of the first illumination light and the second illumination light, and which guides the detection light to a detection light path, wherein the detection light is generated from the sample by application of the first illumination light or the second illumination light; and
    a light detector which is placed in the detection light path, and which detects the detection light.

6. The laser microscope according to claim 5, wherein the light detector comprises a two-dimensional sensor which is placed on a position that is optically conjugate with the sample, and which detects a spatial distribution of intensity of the detection light.

7. The laser microscope according to claim 6, wherein the detection light path separation unit is placed between the objective and the two-dimensional scanning unit.

8. The laser microscope according to claim 5, wherein the light detector is placed in a vicinity of a position that is optically conjugate with the pupil position of the objective.

9. The laser microscope according to claim 5, further comprising a confocal stop which is placed at a position between the detection light path separation unit and the light detector, wherein the position of the confocal stop is optically conjugate with the sample, and wherein the detection light path separation unit is placed between the second laser light source and the two-dimensional scanning unit.

10. The laser microscope according to claim 1, further comprising:
 a transmission detection optical system in which light which has passed through the sample enters; and
 a light detector which detects detection light generated from the sample with application of the first illumination light or the second illumination light, through the transmission detection optical system.

11. The laser microscope according to claim 1, further comprising a storage unit which stores, for each image height and each wavelength of the first illumination light, aberration information related to distortion and chromatic aberration of magnification generated in optical systems placed between the objective and the phase-modulation type spatial light modulator and generated in the objective,
 wherein the phase-modulation type spatial light modulator modulates the phase of the first illumination light based on the aberration information obtained from the storage unit.

12. The laser microscope according to claim 1, further comprising a storage unit which stores, for each image height and each wavelength of the first illumination light, aberration information related to wavefront aberration generated in optical systems placed between the objective and the phase-modulation type spatial light modulator and generated in the objective,
 wherein the phase-modulation type spatial light modulator modulates the phase of the first illumination light based on the aberration information obtained from the storage unit.

13. The laser microscope according to claim 1, further comprising an imaging unit which images the sample on which the first illumination light whose phase has been modulated by the phase-modulation type spatial light modulator is applied, to obtain a light application pattern formed on the sample,
 wherein the phase-modulation type spatial light modulator adjusts modulation of the phase of the first illumination light so as to reduce the difference between a desired pattern and the light application pattern obtained by the imaging unit.

14. The laser microscope according to claim 1, further comprising an imaging unit which has a plurality of pixel parts and which images the sample on which the first illumination light whose phase has been modulated by the phase-modulation type spatial light modulator is applied, to obtain a light application pattern formed on the sample,
 wherein the laser microscope stores a position of the pixel parts in which the second illumination light deflected by the two-dimensional scanning unit enters, in association with a parameter for controlling a scanning position of the two-dimensional scanning unit at a time when the second illumination light enters the pixel parts.

\* \* \* \* \*